United States Patent [19]
Lew

[11] Patent Number: 5,150,612
[45] Date of Patent: Sep. 29, 1992

[54] DUAL REVOLVING VANE PUMP-MOTOR-METER

[76] Inventor: Hyok S. Lew, 7890 Oak St., Arvada, Colo. 80005

[21] Appl. No.: 598,161

[22] Filed: Oct. 16, 1990

[51] Int. Cl.⁵ .............................................. G01F 3/08
[52] U.S. Cl. ........................................ 73/253; 73/261
[58] Field of Search .................. 73/253, 259–267; 418/7, 9, 227

[56] References Cited

U.S. PATENT DOCUMENTS

| | | | |
|---|---|---|---|
| 655,198 | 8/1900 | Code | 418/7 |
| 673,470 | 5/1901 | Dow | 418/9 |
| 2,309,443 | 1/1943 | Cuthbert | 418/9 |
| 2,464,481 | 3/1949 | Berry | 418/9 |
| 2,835,229 | 5/1958 | Richards | 418/7 |
| 3,457,835 | 7/1969 | Siebold | 73/261 |
| 3,502,032 | 3/1970 | Lauer | 418/7 |

Primary Examiner—Herbert Goldstein

[57] ABSTRACT

A positive displacement apparatus usable as a pump or motor or flowmeter comprises a first revolving vane rotatably disposed in a first cylindrical cavity wherein the edge of the first revolving vane sweeps on a circular cylindrical portion of the cylindrical wall of the first cylindrical cavity, and a second revolving vane rotatably disposed in a second cylindrical cavity wherein the edge of the second revolving vane sweeps on a circular cylindrical portion of the cylindrical wall of the second cylindrical cavity, wherein the rotating motions of the first and second revolving vanes are coupled to one another in such a way that the edge of at least one of the first and second revolving vanes sweeps on respective circular cylindrical portions of the cylindrical walls of the respective cylindrical cavities at all instances, whereby a fluid moving through the first and second cylindrical cavities providing a flow passage in series results in a rotating motion of the revolving vanes and vice versa.

9 Claims, 3 Drawing Sheets

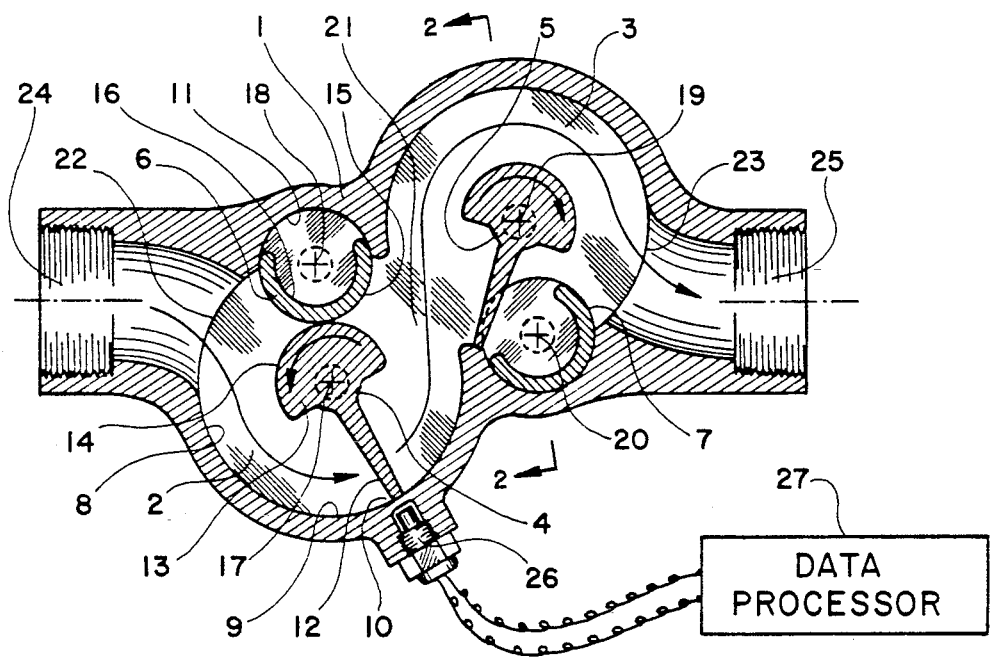
Fig. 1
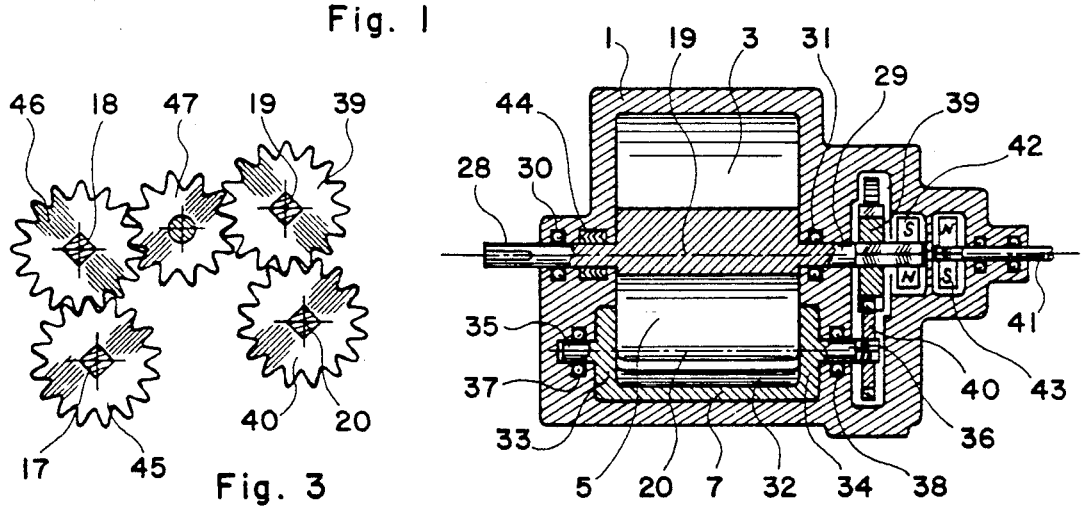
Fig. 3
Fig. 2
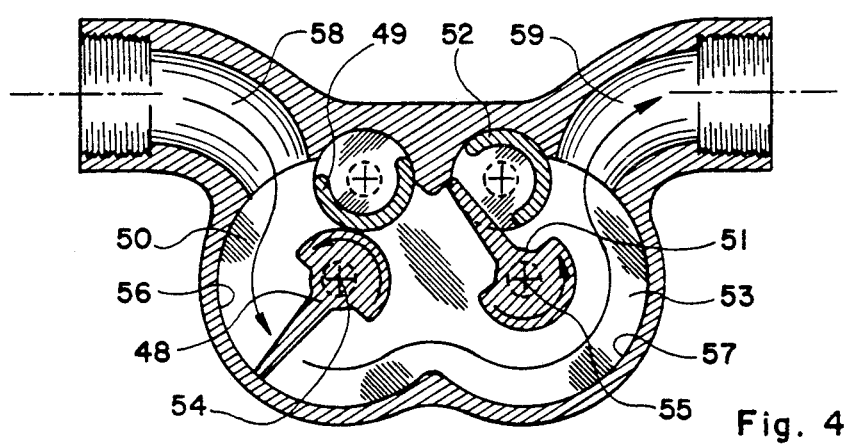
Fig. 4

DUAL REVOLVING VANE PUMP-MOTOR-METER

BACKGROUND OF THE INVENTION

There are many different versions of the so called positive displacement pumps or motors or flowmeters, which are employed in moving fluids or harnessing power from moving fluids or measuring the flow rate of fluids. These positive displacement devices employed as a pump or motor or flowmeter operate on the principles that the flow of fluid and the rotating motion of the rotor included in the positive displacement device are positively or semi-positively coupled to one another, whereby the rotating motion of the rotor positively moves the fluid or the motion of the fluid positively rotates the rotor. With few exceptions, most of the existing versions of the positive displacement pumps, motors and flowmeters suffer from at least one of the two short-comings of the following description: Firstly, the most serious problem with the existing positive displacement apparatus is the high frictional resistance between the rotor and rotor housing of the positive displacement device, which frictional resistance is primarily responsible for the low efficiency of the pumps and motors operating on the principles of positive displacement as well as for the inability of the flowmeters of positive displacement types to measure very low flow rates of fluids. Secondly, existing positive displacement devices whether used as a pump or motor or flow- meter have ungainly large bulk in comparison with the actual capacity of fluid flow handled thereby. In other words, the overwhelmingly large portion of the wetted volume in the existing positive displacement devices are occupied by the rotor assembly, which leaves only a small portion of the wetted volume to be occupied by the fluid. This feature of the existing positive displacement devices is highly undesirable in terms of functional aspect as well as the economics of operation as the unnecessarily bulky and heavy devices are expensive to manufacture and inefficient in operation. The present invention teaches a positive displacement device that has a highly efficient construction and a very low friction between the rotor and the rotor housing of the device, which positive displacement device may be used as a pump or motor or flowmeter.

BRIEF SUMMARY OF THE INVENTION

The primary object of the present invention is to provide a positive displacement device usable as a pump or motor or flowmeter, that comprises a pair of cylindrical cavities respectively including a pair of rotatable vanes, each of which vanes radially extends from a cylindrical hub rotatably disposed within each of the pair of cylindrical cavities in a coaxial arrangement, wherein at least one-half of the cylindrical wall of the cylindrical cavity substantially coincides with a hypothetical circular cylindrical surface swept by the edge of the vane and the other half includes a longitudinal recess substantially coinciding with a portion of a circular cylindrical surface, which longitudinal recess receives a cylindrical roller with a matching circular cylindrical surface disposed rotatably and eccentrically within the cylindrical cavity in a parallel relationship to the cylindrical hub of the vane. The cylindrical roller includes an axially disposed recess in the circular cylindrical surface thereof, and at least one half of the cylindrical surface of the cylindrical hub of the vane diametrically opposite to the vane substantially coincides with a circular cylindrical surface tangential to the circular cylindrical surface of the cylindrical roller, wherein the rotating motions of the cylindrical roller and the cylindrical hub of the vane are mechanically coupled to one another in such a way that they rotate at the same angular velocity and the axially disposed recess included in the cylindrical roller accommodates the vane during relative rotation therebetween, whereby the combination of the vane and the cylindrical hub thereof and the cylindrical roller provides a barrier radially extending across the cross section of the cylindrical cavity during one half of the revolution of the vane wherein the edge of the vane slides on the circular cylindrical portion of the cylindrical surface of the cylindrical cavity. The revolving motions of the pair of vanes respectively included in the pair of cylindrical cavities are mechanically coupled to one another in such a way that the edge of one of the two vanes slides on the circular cylindrical portion of the cylindrical wall of the respective cylindrical cavity when the edge of the other of the two vanes leaves the circular cylindrical portion of the cylindrical wall of the respective cylindrical cavity for all instances, whereby the motion of the fluid moving through a flow passage provided by the two cylindrical cavities connected to one another and an inlet and outlet port respectively open to the two cylindrical cavities, which ports are disposed through the halves of the cylindrical walls of the cylindrical cavities opposite to the respective circular cylindrical portions thereof, is always coupled to the revolving motion of the two vanes mechanically coupled to one another.

Another object is to provide the positive displacement device described in the primary object of the present invention, wherein the two vanes are mechanically coupled to rotate in two opposite directions.

A further object is to provide the positive displacement device described in the primary object of the present invention, wherein the two vanes revolve in the same direction.

Yet another object is to provide the positive displacement device described in the primary object of the present invention, wherein the two vanes respectively have two separate cylindrical rollers.

Yet a further object is to provide the positive displacement device described in the primary object of the present invention, wherein the two vanes share a common cylindrical roller.

These and other objects of the present invention will become clear as the description thereof progresses.

BRIEF DESCRIPTION OF THE FIGURES

The present invention may be described with a great clarity and specificity by referring to the following figures:

FIG. 1 illustrates a cross section of an embodiment of the dual revolving vane positive displacement pump-motor-meter of the present invention.

FIG. 2 illustrates another cross section of the embodiment shown in FIG. 2.

FIG. 3 illustrates an embodiment of the arrangement of gearing coupling the rotary motions of the vanes and the cylindrical rollers included in the embodiment shown in FIGS. 1 and 2.

FIG. 4 illustrates a cross section of another embodiment of the dual revolving vane pump-motor-meter.

DESCRIPTION OF THE ILLUSTRATED EMBODIMENT

Figure 5:
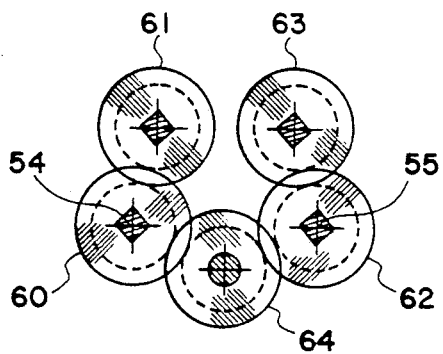
FIG. 5 illustrates an embodiment of the arrangement of gearing included in the embodiment shown in FIG. 4.

In FIG. 1 there is illustrated a cross section of an embodiment of the dual revolving vane pump-motor-meter constructed in accordance with the principles of the present invention, which comprises a body 1 including a pair of cylindrical cavities 2 and 3 respectively housing a pair of revolving vanes 4 and 5, and a pair of cylindrical rollers 6 and 7. As two combinations including the revolving vane and the cylindrical roller housed in the cylindrical cavity have the same construction, the detailed description of the elements and structures thereof will be made by referring to only one of the two combinations of the aforementioned elements. The cylindrical cavity 2 has two flat end walls and a cylindrical wall 8 wherein at least one half 9 thereof substantially coincides with a circular cylindrical surface swept by the edge 10 of the revolving vane 5. A portion of the cylindrical wall 8 of the cylindrical cavity 2 diametrically opposite to the circular cylindrical portion 9 includes a longitudinal recess 11 receiving the cylindrical roller 6, wherein at least the two edges of the longitudinal recess 11 are under a close tolerance with the circular portion of the cylindrical surface of the cylindrical roller 6. The revolving vane 4 extending from one end wall to the other end wall of the cylindrical cavity 2 comprises a planar extension 12 radially extending from a cylindrical hub member 13, wherein at least one half 14 of the cylindrical surface thereof diametrically opposite to the planar extension 12 substantially coincides with a circular cylindrical surface tangential to the circular cylindrical portion 15 of the cylindrical surface of the cylindrical roller 6. The cylindrical roller 6 has an axially disposed recess 16. The revolving vane 4 is supported by the body 1 rotatably about the axis of rotation 17 concentric to the circular cylindrical portion 9 of the cylindrical wall of the cylindrical cavity 2, while the cylindrical roller 6 is supported by the body 1 rotatably about the axis of rotation 18 located on a plane dividing the opening of the axially disposed recess 11 to the two equal halves. The rotating motions of the revolving vane 4 and the cylindrical roller 6 are mechanically coupled to one another in such a way that they rotate preferably in two opposite directions at the same angular velocity and the circular cylindrical portions 14 and 15 of the cylindrical surfaces of the cylindrical hub member 13 and the cylindrical roller 6 are under a close tolerance therebetween during the time interval wherein the tip 10 of the revolving vane 4 sweeps on the circular cylindrical portion 9 of the cylindrical wall of the cylindrical cavity 4, whereby the combination of the revolving vane 4 and the cylindrical roller 6 provides a barrier dividing the cylindrical cavity 2 into two halves over a time period at least equal to or greater than one half of the period of rotation of the revolving vane about the axis of rotation 17 during each revolution thereof. The longitudinal recess 16 included in the cylindrical roller 6 accomodates the planar extension 12 of the revolving vane 4 during the relative angular rotation therebetween. The rotating motions of the revolving vane 5 revolving about the axis of rotation 19 and cylindrical roller 7 rotating about the axis of rotation 20 are mechanically coupled to one another in the same manner as the mechanical coupling of the rotating motions of the revolving vane 4 and the cylindrical roller 6. The combination of the revolving vane 4 and the cylindrical roller 6 housed in the cylindrical cavity 2 and the combination of the revolving vane 5 and the cylindrical roller 7 housed in the cylindrical cavity 3 are disposed axisymmetrically about an axis coinciding with the line of intersection of two planes respectively including the rotating axes 17 and 19 of the revolving vanes and the rotating axes 18 and 20 of the cylindrical rollers. The rotating motions of the two revolving vanes are mechanically coupled to one another in such a way that they rotate at the same angular velocity in two opposite directions and the edge of at least one of the two revolving vanes 2 and 3 sweeps on respective circular cylindrical portions of the cylindrical walls of respective cylindrical cavities at all instances. The two cylindrical cavities 2 and 3 are connected to one another by an opening disposed through adjacent portions of the cylindrical walls thereof, which adjacent portions are located on the other halves of the respective cylindrical walls opposite to the circular cylindrical portions thereof, wherein the same other halves of the cylindrical walls also include openings 22 and 23 respectively extending to the inlet and outlet ports 24 and 25. It should be noticed that the openings 21 and 22 are disposed on two opposite sides of a plane including the axes of rotation 17 and 18, while the openings 21 and 23 are disposed on two opposite sides of a plane including the axes of rotation 19 and 20. Now it has become self-evident that the fluid moving through the two cylindrical cavities 2 and 3 must accompany rotating motion of the revolving vanes 4 and 5, and the rotating motion of the revolving vanes 4 and 5 must accompany a fluid movement through the two cylindrical cavities 2 and 3. As a consequence, the apparatus shown in FIG. 1 can be used as a pump or motor or flowmeter. The rotating speed of the revolving vane 4 may be measured by a proximity type motion sensor 26 that generates an electrical pulse as the edge of revolving vane 4 passes thereby. The data processor 27 determines the volume flow rate of fluid moving through the positive displacement apparatus from the electrical pulses supplied thereto by the proximity type motion sensor 26, which data processor may also determine the accumulative volume of the fluid flow. Of course, the rotating speed of the revolving vane may be measured mechanically as a measure of the volume flow rate of fluid by a mechanical counter as shown in FIG. 2. While the positive displacement apparatus shown in FIG. 1 works with any combination of radii of the circular cylindrical portions of the cylindrical surfaces of the cylindrical hub member and the cylindrical roller under a rolling contact therebetween, it operates most efficiently when the radii of the circular cylindrical surfaces of the cylindrical hub member and the cylindrical roller are the same. It should be mentioned that the two cylindrical cavities 2 and 3 having basic cross sections of circular geometry may partially over-lap one another as in the case of the particular illustrative embodiment shown in FIG. 1 or they may not over-lap one another in other alternative embodiment wherein a flow passage extending through the portions of the cylindrical walls thereof, where the opening 21 is located, connects the two cylindrical cavities 2 and 3 to one another.

In FIG. 2 there is illustrated another cross section of the embodiment shown in FIG. 1, which cross section is taken along plane 2—2 as shown in FIG. 1. The revolving vane 5 is rotatably supported about the axis of rotation 19 as a pair of shafts 28 and 29 coaxial to the axis of rotation 19 and respectively extending in the two opposite directions from the revolving vane 4 respectively engage two bearings 30 and 31 affixed to the body 1. The axially disposed recess 32 included in the cylindrical roller 7 extends from one end flange 33 to the other end flange 34 of the cylindrical roller 7. The inner faces of the end flanges 33 and 34 are flush to the end faces of the cylindrical cavity 3. The cylindrical roller 7 is rotatably supported by a pair of shafts 35 and 36 respectively extending from the two end flanges 33 and 34 in two opposite directions, wherein the shafts 35 and 36 respectively engage two bearings 37 and 38 affixed to the body 1. The rotating motions of the revolving vane 5 and the cylindrical roller 7 are mechanically coupled to one another by a pair of gears 39 and 40 having the same pitch diameter and engaging one another. The rotating speed of the revolving vane 5 may be transmitted to a shaft 41 coupled to a mechanical counter (not shown) by a magnetic coupling comprising a pair of magnets 42 and 43 respectively affixed to the shafts 29 and 41. When the positive displacement apparatus shown in FIGS. 1 and 2 is used as a pump or motor, the shaft 28 must extend through the end wall of the cylindrical cavity 3 and out of the body 1, whereby a power input means such as a motor or a power takeoff means can be coupled thereto, wherein a rotary seal 44 prevents the fluid from leaking out of the cylindrical cavity 3. When the positive displacement apparatus shown in FIGS. 1 and 2 is used as a flowmeter, the shaft 28 should not extend out of the body 1 and the rotary seal 44 should be omitted.

In FIG. 3 there is illustrated an embodiment of gearing mechanically coupling the rotating motions of the revolving vanes 4 and 5 respectively rotating about the axes of rotation 17 and 19, and the cylindrical rollers respectively rotating about the axes of rotation 18 and 20. The rotating motions of the revolving vane 5 and the cylindrical roller 7 are coupled to one another by two gears 39 and 40 engaging one another, while the rotating motions of the revolving vane 4 and the cylindrical roller 6 are coupled to one another by two gears 45 and 46 engaging one another, wherein all four gears 39, 40, 45 and 46 have the same pitch diameter whereby they rotate at the same angular velocity as the gears 39 and 46 are sumultaneously engaged by a gear 47 coupling the rotating motions of the gears 39 and 46 to one another.

In FIG. 4 there is illustrated a cross section of another embodiment of the dual revolving vane pump-motor-meter, which comprises a first combination of the revolving vane 48 and the cylindrical roller 49 housed in the cylindrical cavity 50, and a second combination of the revolving vane 51 and the cylindrical roller 52 housed in the cylindrical cavity 53, wherein the two combinations are disposed in a symmetric arrangement about a hypothetical plane therebetween. Each of the two combinations of the revolving vane and the cylindrical roller housed in the cylindrical cavity has essentially the same construction as that described in conjunction with the embodiment shown in FIG. 1. The rotating motions of the revolving vanes 48 and 51 are mechanically coupled to one another in such a way that they rotate about respective axes of rotation 54 and 55 at the same angular velocity in the same direction, and the edge of at least one of the two revolving vanes 48 and 51 sweeps on respective circular cylindrical portions 56 and 57 of the cylindrical walls of respective cylindrical cavities at all instances. The two cylindrical cavities 50 and 53 having basic cross sections of circular geometry may over-lap one another as in the case of the particular illustrative embodiment shown in FIG. 4, wherein the phase angle between the two revolving vanes 48 and 51 is set in such a way that the edge of the revolving vane 51 engages the circular cylindrical portion 57 of the cylindrical cavity wall before the edge of the revolving vane 48 leaves the circular cylindrical portion 56 of the cylindrical cavity wall, whereby the two revolving vanes 48 and 56 do not collide. In other alternative embodiments, the two cylindrical cavities 50 and 53 having basic cross sections of circular geometry may not over-lap one another, wherein the two cylindrical cavities are connected to one another by a flow passage extending through portions of the cylindrical walls thereof located in areas other than the circular cylindrical portions 56 and 57 thereof. It should be noticed that the inlet and outlet ports 58 and 59 are disposed in a symmetric arrangement about the plane of symmetry of the apparatus, while the inlet and outlet ports included in the embodiment shown in FIG. 1 are disposed in an axisymmetric arrangement about the axis of axisymmetry of the apparatus.

In FIG. 5 there is illustrated an embodiment of gearing mechanically coupling the rotating motions of the revolving vanes 48 and 51, and the cylindrical rollers 49, and 52. The rotating motions of the revolving vane 48 and the cylindrical roller 49 are coupled to one another by a pair of gears 60 and 61 engaging one another, while the rotating motions of the revolving vane 51 and the cylindrical roller 52 are coupled to one another by a pair of gears 62 and 63 engaging one another, wherein all four gears 60, 61, 62 and 63 have the same pitch diameter. The rotating motions of the two revolving vanes 48 and 51 are coupled to one another by a gear 64 simultaneously engaging the gears 60 and 62. While the embodiment shown in FIG. 4 works with any combination of radii of the cylindrical hub member of the revolving vane and the cylindrical roller, it operates most efficiently when the radii thereof are the same.

Figure 6:
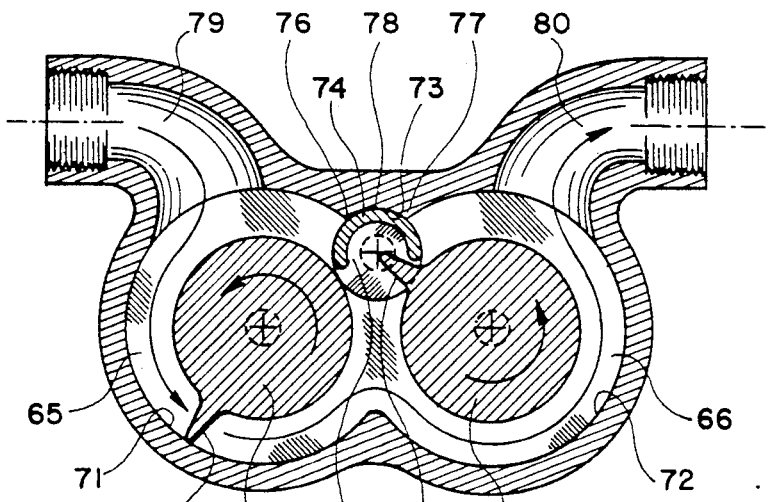
FIG. 6 illustrates a cross section of a further embodiment of the dual revolving vane pump-motor-meter.

In FIG. 6 there is illustrated a cross section of a further embodiment of the dual revolving vane pump-motor-meter including two cylindrical cavities 65 and 66 having basic cross sections of circular geometry and over-lapping one another, which two cylindrical cavities 65 and 66 respectively includes a circular cylindrical hub members 67 and 68 coaxially disposed therein in a rotatable arrangement and respectively anchoring planar vanes 69 and 70 radially extending therefrom respectively. The edges of the planar vanes 69 and 70 respectively sweeps on the circular cylindrical portions 71 and 72 of the cylindrical walls of the cylindrical cavities 65 and 66. A longitudinal recess 73 disposed following the juncture of the two cylindrical walls of the cylindrical cavities 65 and 66 located diametrically opposite to the two circular cylindrical portions 71 and 72 of the cylindrical cavity walls receives a circular cylindrical roller 74 including a longitudinal recess 75 accomodating the planar vanes 69 and 70 during the rotating movements thereof. At least the two edges 76 and 77 of the longitudinal recession 73 are under a close tolerance with the circular cylindrical portion 78 of the cylindrical surface of the cylindrical roller 74, which circular cylindrical portion is substantially under rolling contact with the circular cylindrical surfaces of the cylindrical hub members 67 and 68. The rotating motion of the cylindrical roller 74 is simultaneously coupled to the rotating motions of the cylindrical hub members 67 and 68 in such a way that the cylindrical hub members 67 and 68 rotate in a direction opposite to the direction of rotation of the cylindrical roller 74 at an angular velocity equal to one half of the angular velocity of the cylindrical roller. whereby the longitudinal recess 75 accomodates the planar vanes 69 and 70 during the rotating movements thereof. The phase angle between the planar vanes 69 and 70 is set in such a way that they clear each other and the edge of at least one of the planar vanes 69 and 70 sweeps on respective circular cylindrical portions 71 and 72 of the cylindrical walls of respective cylindrical cavities 65 and 66 at all instances. The inlet port 79 extends to the cylindrical cavity 65 through a portion of the cylindrical wall thereof adjacent to one edge 76 of the longitudinal recess 78, while the outlet port 80 extends to the cylindrical cavity 66 through a portion of the cylindrical wall thereof adjacent to the other edge 77 of the longitudinal recess 78.

Figure 7:
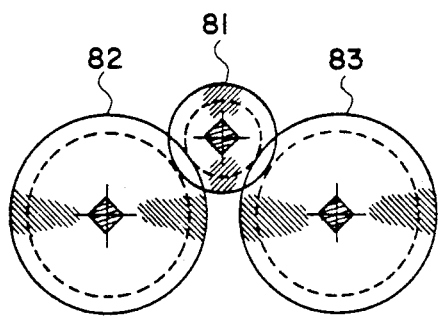
FIG. 7 illustrates an embodiment of the arrangement of gearing included in the embodiment shown in FIG. 6.

In FIG. 7 there is illustrated an embodiment of gearing that couples the rotating motion of the cylindrical roller 74 to the rotating motions of the cylindrical hub members 67 and 68. The gear 81 coaxially affixed to the cylindrical roller 74 simultaneously engages gears 82 and 83 respectively affixed to the cylindrical hub members 67 and 68 in coaxial arrangement. wherein the gears 82 and 83 have the same pitch diameter. while the gear 81 has a pitch diameter equal to one half of the pitch diameter of the gear 82 or 83.

Figure 8:
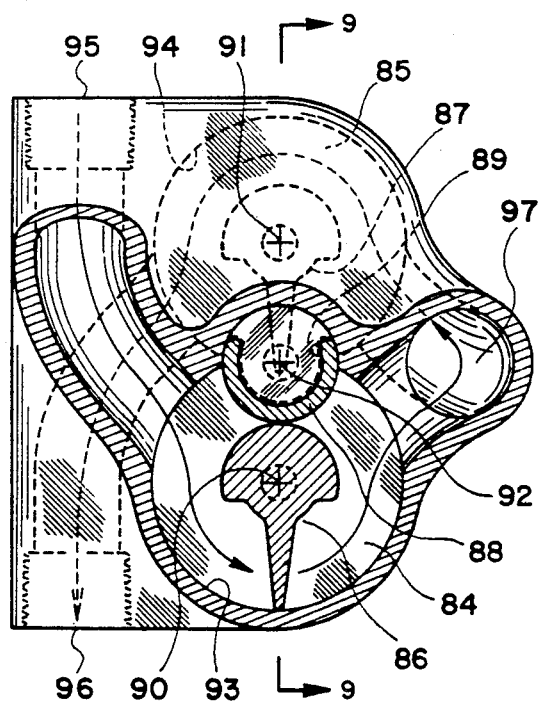
FIG. 8 illustrates a cross section of yet another embodiment of the dual revolving vane pump-motor-meter.

In FIG. 8 there is illustrated a cross section of yet another embodiment of the dual revolving vane pump-motor-meter, that comprises a pair of cylindrical cavities 84 and 85 respectively housing a pair of revolving vanes 86 and 87 and a pair of cylindrical rollers 88 and 89 with longitudinal recess included in the cylindrical surface thereof. Each of the two combinations of the cylindrical cavity, revolving vane and the cylindrical roller have essentially the same construction as that of the equivalent combination described in conjunction with FIG. 1. In this particular illustrative embodiment, the two cylindrical cavities 84 and 85 are disposed in an off-set arrangement in a direction parallel to the central axes thereof, and the axes of rotation 90 and 91 of the two revolving vanes 86 and 87, and the common axis of rotation 92 of the cylindrical rollers 88 and 89 are disposed on a first plane of symmetry in the arrangement of the cylindrical cavities, revolving vanes and cylindrical rollers. The two cylindrical rollers 88 and 89 disposed in an in-line and coaxial arrangement include a common shaft rotatably supported by bearings affixed to the body of the apparatus. The circular cylindrical portions 93 and 94 of cylindrical walls of the two cylindrical cavities 84 and 85 are disposed in a mirror image to one another about a second plane of symmetry including the axis of rotation 92 of the cylindrical rollers 88 and 89 and perpendicular to the plane including the axes of rotation 90. 91 and 92. The inlet port 95 extends into the first cylindrical cavity 84 through a portion of the cylindrical wall thereof diametrically opposite to the circular cylindrical portion 93 of the cylindrical wall and located on one side of the first plane of symmetry including the axes of rotation 90. 91 and 92. while the outlet port 96 extends into the second cylindrical cavity 85 through a portion of the cylindrical wall thereof diametrically opposite to the circular cylindrical portion 94 of the cylindrical wall and located on one side of the first plane of symmetry. The flow passage 97 connecting the two cylindrical cavities 84 and 85 to one another extends into respective cylindrical cavities through respective cylindrical portions of the cylindrical walls diametrically opposite to respective circular cylindrical portions thereof and located on the other side of the first plane of symmetry including the axes of rotation 90. 91 and 92. The common rotating motion of the cylindrical rollers 88 and 89 is simmultaneously coupled to the rotating motions of the revolving vanes 86 and 87 in such a way that the two revolving vanes 86 and 87 rotate at the same angular velocity as the common angular velocity of the cylindrical rollers 88 and 89, and there is little phase angle difference between the rotations of the two revolving vanes. The two longitudinal recesses respectively included in the two cylindrical rollers in an in-line arrangement accommodate the planar extensions included in the revolving vanes 86 and 87, respectively.

Figure 9:
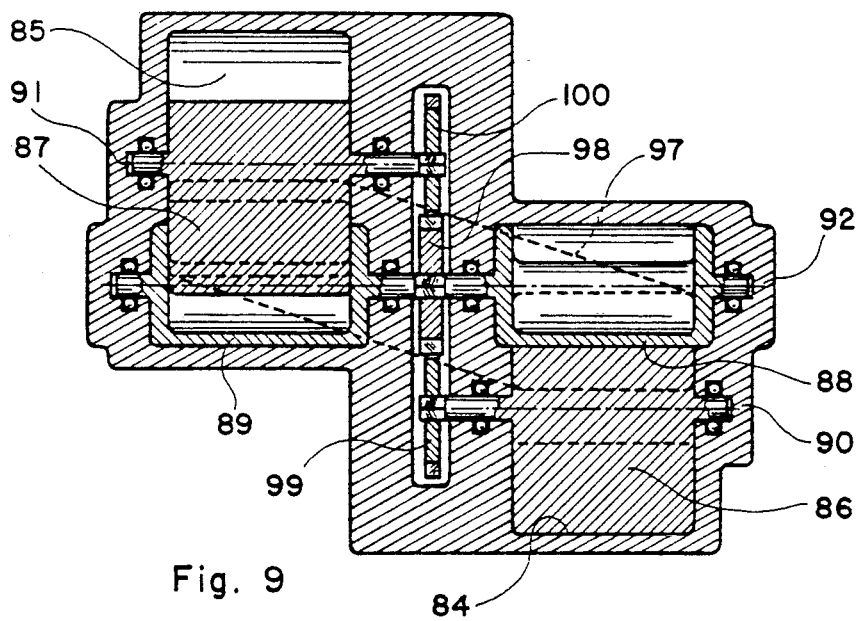
FIG. 9 illustrates another cross section of the embodiment shown in FIG. 8.

In FIG. 9 there is illustrated another cross section of the embodiment shown in FIG. 8. which cross section taken along plane 9—9 as shown in FIG. 8 clearly shows the cylindrical rollers 88 and 89 disposed in an in-line and coaxial arrangement. The rotating motions of the common shaft supporting the cylindrical rollers 88 and 89 are simultaneously coupled to the rotating motions of the revolving vanes 86 and 87 by a gear 98 affixed to the common shaft of the cylindrical rollers 88 and 89 and simultaneously engaging gears 99 and 100 respectively affixed to the shafts of the revolving vanes 86 and 87, wherein all three gears 98. 99 and 100 have the same pitch diameter.

Figure 10:
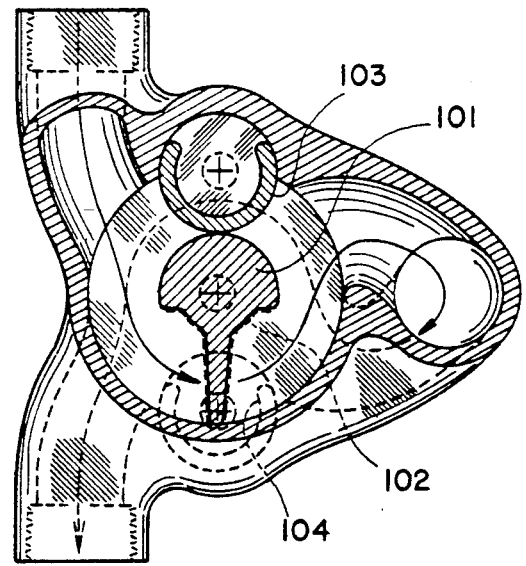
FIG. 10 illustrates a cross section of yet a further embodiment of the dual revolving vane pump-motor-meter.

In FIG. 10 there is illustrated a cross section of yet a further embodiment of the dual revolving vane pump-motor-meter. This particular embodiment results when the combination of the cylindrical cavity 85, the revolving vane 87 and the cylindrical roller 89 included in the embodiment shown in FIGS. 8 and 9 is moved in a parallel shifting movement to a new position wherein the axis of rotation 91 of the revolving vane 87 coincides with the axis of rotation 90 of the revolving vane 86. The common rotating motion of the two revolving vanes 101 and 102 now supported by a common shaft is simultaneously coupled to the rotating motions of the cylindrical rollers 103 and 104 by three gears of identical pitch diameter respectively affixed to the shafts of the three rotating elements 101-102, 103 and 104.

Figure 11:
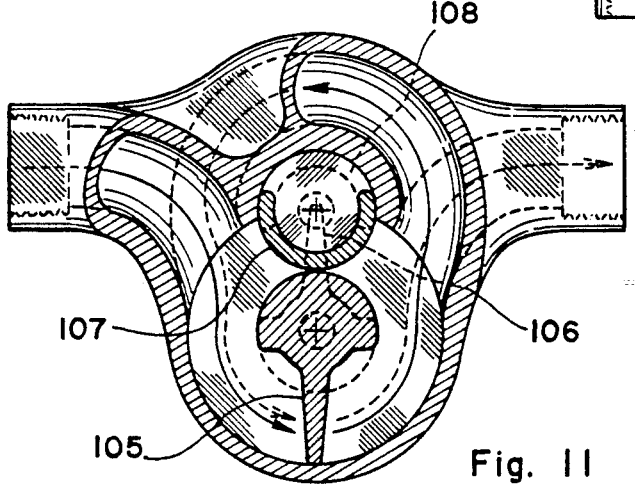
FIG. 11 illustrates a cross section of still another embodiment of the dual revolving vane pump-motor-meter.

In FIG. 11 there is illustrated a cross section of still another embodiment of the dual revolving vane pump-motor-meter. This particular embodiment results when the combination of the cylindrical cavity 85, the revolving vane 87 and the cylindrical roller 89 included in the embodiment shown in FIG. 8 is moved in a parallel shifting movement to a new position wherein the axis of rotation 91 of the revolving vane 87 now coincides with the axis of rotation 90 of the revolving vane 86, and then the combination of the cylindrical cavity 85 the revolving vane 87 and the cylindrical roller 89 now shifted to the new position is rotated over 180 degrees about the common axis of rotation of the two revolving vanes. As the two rotating vanes 105 and 106 now disposed in an in-line and coaxial arrangement are fixedly coupled to one another as well as the two cylindrical rollers 107 and 108 now disposed in an in-line and coaxial arrangement are fixedly coupled to one another, only two gears of identical pitch diameter are now required to couple the common rotating motion of the two revolving vanes 105 and 106 to the common rotating motion of the two revolving cylindrical rollers 107 and 108.

It should be mentioned that the embodiments shown in FIGS. 1, 4 and 6 provide an advantage in view that these embodiment have a smooth flow passage therethrough resulting in less pressure drop in the fluid flow, while the embodiments shown in FIGS. 8, 10 and 11 provide an advantage in view of the simpler and compact structure. While the principles of the present inventions have now been made clear by the illustrative embodiments, there will be many modifications of the structures, arrangements, proportions, elements and materials, which are obvious to those skilled in the art and particularly adapted to the specific working environments and operating conditions in the practice of the invention without departing from those principles. It is not desired to limit the inventions to the particular illustrative embodiments shown and described, and accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for measuring rate of fluid flow comprising in combination:
    a) a body including a pair of cylindrical cavities having closed end walls and connected to one another by an opening, each of said pair of cylindrical cavities having a cylindrical wall with at least one half thereof substantially coinciding with a circular cylindrical surface of a first diameter, and a cylindrical hub member having at least one half of the cylindrical surface thereof substantially coinciding with another circular cylindrical surface of a second diameter less than said first diameter and coaxial to said a circular cylindrical surface, and including a vane radially extending from the cylindrical hub member in a direction opposite to said circular cylindrical surface portion thereof, said cylindrical hub member disposed within the cylindrical cavity rotatably about an axis of rotation coinciding with the common axis of said a and another circular cylindrical surfaces wherein radial edge of the vane describes said a circular cylindrical surface during rotation of the cylindrical hub member; each of said pair of cylindrical cavities further including a recess included in a portion of wall thereof in a parallel relationship to said common axis, and a cylindrical roller rotatably disposed partially in the recess and having a major portion of cylindrical surface thereof substantially coinciding with a circular cylindrical surface tangential to said another circular cylindrical surface and a minor portion of cylindrical surface thereof including an axially disposed cavity radially extending inwardly from said minor portion of the cylindrical surface, said cavity large enough to accommodate said a vane extending from the cylindrical hub member; wherein said combinations of the recess and the cylindrical roller respectively included in said pair of cylindrical cavities are respectively disposed on two opposite sides of a plane including the axes of rotation of said cylindrical hub members respectively included in said pair of cylindrical cavities, and each combination of the circular cylindrical portions of cylindrical surfaces of the cylindrical hub member and the cylindrical roller included in each of said pair of cylindrical cavities provides a barrier against fluid flow thereacross;
    b) a first port open to one of said pair of cylindrical cavities through a portion of cylindrical wall thereof adjacent to the circular cylindrical portion thereof and located on one side of the cylindrical roller included in the cylindrical cavity opposite to the side including said opening connecting said pair of cylindrical cavities to one another, and a second port open to the other of said pair of cylindrical cavities through a portion of cylindrical wall thereof adjacent to the circular cylindrical portion thereof and located on the other side of the cylindrical roller included in the cylindrical cavity opposite to the side including said opening connecting said pair of cylindrical cavities to one another; and
    c) rotating motion coupling means coupling rotating motions of the cylindrical hub members and the cylindrical rollers in such a way that the cylindrical hub members respectively included in said pair of cylindrical cavities rotate at the same speed in opposite directions, and the cylindrical hub member and the cylindrical roller included in each of said pair of cylindrical cavities rotate at the same speed in opposite directions wherein the cavity included in the cylindrical roller accommodates the vane extending from the cylindrical hub member during rotation thereof, and that the radial edge of at least one of the two vanes slides on respective circular cylindrical portions of the cylindrical walls of said pair of cylindrical cavities at all instances; wherein fluid entering through said first port and exiting through said second port flows across said plane including the axes of rotation of the cylindrical hub members through a space between the cylindrical hub members respectively included in said pair of cylindrical cavities, and produces rotation of the two vanes and vice versa.

2. A combination as set forth in claim 1 wherein said combination includes a means for measuring angular velocity of at least one of the two vanes as a measure of fluid flow through the apparatus.

3. A combination as set forth in claim 1 wherein said combination includes a power transmitting means coupled to rotating motion of at least one of the two vanes.

4. An apparatus for measuring rate of fluid flow comprising in combination:
    a) a body including a pair of cylindrical cavities having closed end walls and connected to one another by an opening, each of said pair of cylindrical cavities having a cylindrical wall with at least one half thereof substantially coinciding with a circular cylindrical surface of a first diameter, and a cylindrical hub member having at least one half of the cylindrical surface thereof substantially coinciding with another circular cylindrical surface of a second diameter less than said first diameter and coaxial to said a circular cylindrical surface, and including a vane radially extending from the cylindrical hub member in a direction opposite to said circular cylindrical surface portion thereof, said cylindrical hub member disposed within the cylindrical cavity rotatably about an axis of rotation coinciding with the common axis of said a and another circular cylindrical surfaces wherein radial edge of the vane describes said a circular cylindrical surface during rotation of the cylindrical hub member; each of said pair of cylindrical cavities further including a recess included in a portion of wall thereof in a parallel relationship to said common axis, and a cylindrical roller rotatably disposed partially in the recess and having a major portion of cylindrical surface thereof substantially coinciding with a circular cylindrical surface of a diameter substantially equal to said second diameter and tangential to said another circular cylindrical surface and a minor portion of cylindrical surface thereof including an axially disposed cavity radially extending inwardly from said minor portion of the cylindrical surface, said cavity large enough to accommodate said a vane extending from the cylindrical hub member; wherein said combinations of the recess and the cylindrical roller respectively included in said pair of cylindrical cavities are respectively disposed on two opposite sides of a plane including the axes of rotation of said cylindrical hub members respectively included in said pair of cylindrical cavities, and each combination of the circular cylindrical portions of cylindrical surfaces of the cylindrical hub member and the cylindrical roller included in each of said pair of cylindrical cavities provides a barrier against fluid flow thereacross;

b) a first port open to one of said pair of cylindrical cavities through a portion of cylindrical wall thereof adjacent to the circular cylindrical portion thereof and located on one side of the cylindrical roller included in the cylindrical cavity opposite to the side including said opening connecting said pair of cylindrical cavities to one another, and a second port open to the other of said pair of cylindrical cavities through a portion of cylindrical wall thereof adjacent to the circular cylindrical portion thereof and located on the other side of the cylindrical roller included in the cylindrical cavity opposite to the side including said opening connecting said pair of cylindrical cavities to one another; and c) rotating motion coupling means coupling rotating motions of the cylindrical hub members and the cylindrical rollers in such a way that the cylindrical hub members repectively included in said pair of cylindrical cavities rotate at the same speed in opposite directions, and the cylinderical hub member and the cylindrical roller included in each of said pair of clyindrical cavities rotate at the same speed in opposite directions wherein the cavity included in the cylindrical roller accommodates the vane extending from the cylindrical hub member during rotation thereof, and that the radial edge of at least one of the two vanes slides on repective circular cylindrical portions of the cylindrical walls of said pair of cylindrical cavities at all instances; wherein fluid entering through said first port and exiting through said second port flows across said plane including the axes of rotation of the cylindrical hub members through a space between the cylindrical hub members respectively included in said pair of cylindrical cavitites, and produces rotation of the two vanes and vice versa.

5. A combination as set forth in claim 4 wherein said combination includes a means for measuring angular velocity of at least one of the two vanes as a measure of fliud flow through the apparatus.

6. A combination a set forth in claim 4 wherein said combination includes a power transmitting means coupled to rotating motion of at least one of the two vanes.

7. An apparatus for measuring rate of fluid flow comprising in combination:

a) a body including a pair of cylindrical cavities having closed end walls disposed in a side-by-side and partially over-lapping arrangement, each of said pair of cylindrical cavities having a cylindrical wall with at least one half thereof substantially coinciding with a circular cylindrical surface of a first diameter, and a cylindrical hub member having at least one half of the cylindrical surface thereof substantially coinciding with another circular cylindrical surface of a second diameter less than said first diameter and coaxial to said a circular cylindrical surface, and including a vane radially extending from the cylindrical hub member in a direction opposite to said circular cylindrical surface portion thereof, said cylindrical hub member disposed within said cylindrical cavity rotatably about the common axis of said a and another circular cylindrical surfaces wherein radial edge of the vane describes said a circular cylindrical surface during rotation of the cylindrical hub member; wherein the combination of the pair of cylindrical cavities has a recess included in the wall thereof following a line of intersection between the cylindrical walls of said pair of cylindrical cavities, and a cylindrical roller rotatably disposed partially in the recess and having a major portion of cylindrical surface thereof substantially coinciding with a circular cylindrical surface of diameter substantially equal to one half of said second diameter and simultaneously tangential to the circular cylindrical surface portions of the two cylindrical hub members respectively disposed within said pair of cylindrical cavities, and a minor portion of cylindrical surface thereof including an axially disposed cavity radially extending inwardly from said minor portion of the cylindrical surface, said cavity large enough to accommodate each of the two vanes respectively included in the two cylindrical hub members extending thereinto during rotation of the two cylindrical hub members; wherein the combination of said cylindrical roller and the two cylindrical hub members provides a barrier preventing fluid flow from one of said pair of cylindrical cavities to the other of said pair of cylindrical cavities across the cylindrical roller at all instances;

b) a first port open to one of said pair of cylindrical cavities through a portion of cylindrical wall thereof adjacent to the circular cylindrical portion thereof and located on one side of said recess, and a second port open to the other of said pair of cylindrical cavities through a portion of cylindrical wall thereof adjacent to the circular cylindrical portion thereof and located on the other side of the said recess opposite to said one side; and c) rotating motion coupling means coupling rotating motion of the cylindrical roller to rotating motions of the two cylindrical hub members in such a way that the two cylindrical hub members rotate in the same direction opposite to the direction of rotation of the cylindrical roller at an angular velocity equal to one half of angular velocity of the cylindrical roller and the cavity included in the cylindrical roller alternatively accommodates the two vanes respectively included in the two cylindrical hub members during rotating motions thereof, and that the radial edge of at least one of the two vanes slides on respective circular cylindrical portions of the cylindrical walls of said pair of cylindrical cavities at all instances; whereby flow of fluid moving through the apparatus produces rotating motion of the two vanes and vice versa.

8. A combination as set forth in claim 7 wherein said combination includes a means for measuring angular velocity of a least one of the two vanes as a measure of fluid flow through the apparatus.

9. A combination as set forth in claim 7 wherein said combination includes a power transmitting means coupled to rotating motion of at least one of the two vanes.

* * * * *